United States Patent [19]

Yamamoto et al.

[11] Patent Number: 4,679,821
[45] Date of Patent: Jul. 14, 1987

[54] SEAT BELT APPARATUS

[75] Inventors: Kazuo Yamamoto, Fujisawa; Shuichi Asano, Kawasaki, both of Japan

[73] Assignee: NSK-Warner Kabushiki Kaisha, Tokyo, Japan

[21] Appl. No.: 726,272

[22] Filed: Apr. 23, 1985

[30] Foreign Application Priority Data

Apr. 23, 1984 [JP] Japan .................................. 59-80317

[51] Int. Cl.$^4$ .............................................. B60R 22/00
[52] U.S. Cl. ..................................... 280/808; 297/481
[58] Field of Search ............... 280/801, 804, 807, 808; 297/473, 474, 481

[56] References Cited

U.S. PATENT DOCUMENTS 3,958,812  5/1976  Satzinger ............................ 280/808
4,175,633  11/1979  Andres et al. ....................... 280/807

FOREIGN PATENT DOCUMENTS 2543784  5/1977  Fed. Rep. of Germany ...... 280/808
2920094  11/1980  Fed. Rep. of Germany ...... 280/808

Primary Examiner—John J. Love
Assistant Examiner—Kenneth R. Rice
Attorney, Agent, or Firm—Alan H. MacPherson; Richard Franklin; Thomas S. MacDonald

[57] ABSTRACT

A seat belt apparatus for use in a vehicle includes a webbing extending from a retractor upward along a center pillar of the vehicle and after passing through a slot of a through-anchor mounted at the top of the center pillar extends downward to have its forward end connected to an arm pivotally mounted on the vehicle. The seat belt apparatus also includes a manually operable member, such as handle, pedal or knob, which can be operated by the hand or foot of a passenger seated in position inside the vehicle and the manually operable member is operatively connected to the webbing or arm. The manually operable member can be operated between a first and second position and when it is moved from the first to the second position, the webbing is moved from its retracted position to an advanced position where the passenger can grab the webbing with east without taking any uncomfortable posture.

12 Claims, 10 Drawing Figures

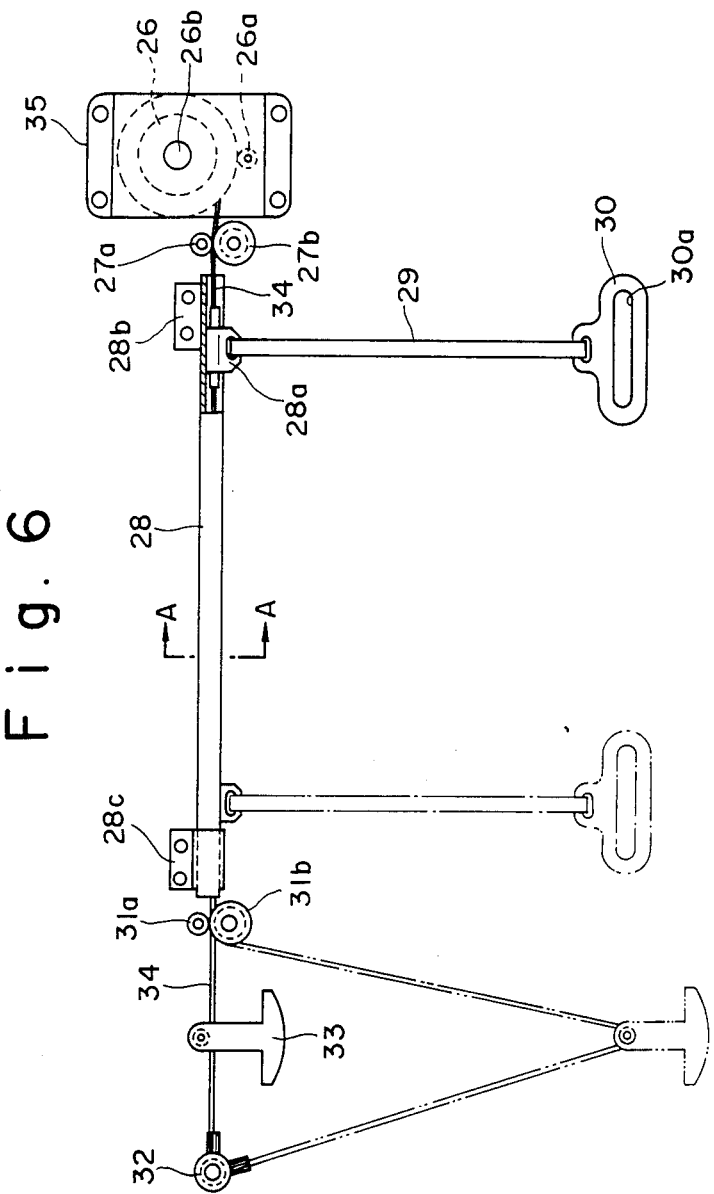

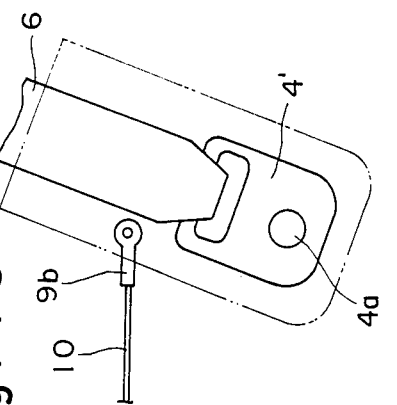
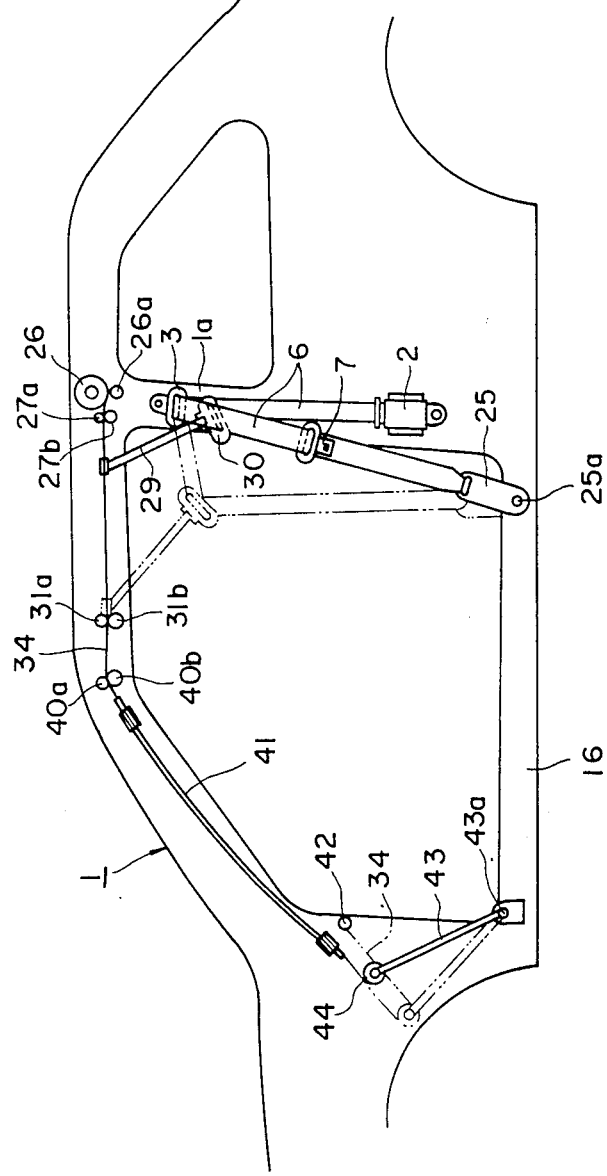

SEAT BELT APPARATUS

BACKGROUND OF THE INVENTION

1. Field of the Invention

This invention relates to a seat belt apparatus for use in a vehicle, such as an automobile, and, in particular, to a three-point seat belt apparatus which can be operated by a passenger seated in a vehicle on his or her own will and without taking an awkward or uncomfortable posture.

2. Description of the Prior Art

A three-point seat belt apparatus is well known in the art and is widely used in various vehicles. In the case of a front seat of a passenger car, in particular a two-door car, provided with a seat belt apparatus for each seat, its webbing is normally located in the rear of the front seat and it normally extends along a center pillar of the car when not in use. Thus, after taking the front seat, when a passenger wishes to operate the seat belt apparatus, the passenger must twist his body to grab the webbing and pull it around his body so as to have its lock tongue inserted into a buckle. In such a case, the passenger must take an uncomfortable posture when trying to grab the webbing of the seat belt apparatus, and, thus, there has been a problem of poor operability in such prior art seat belt apparatus.

Various approaches have been proposed so as to improve the operability of a seat belt apparatus, and such approaches include those which utilize the opening and closing motion of a door or the tilting motion of a tiltable backrest of a seat so as to operate the seat belt apparatus, and those which utilize the seating motion of a passenger to activate a driving source for causing the webbing to move to a position easily accessible to the passenger when seated. At the first glance, such an idea of moving the webbing automatically in response to the seating and unseating movement of the passenger appears to be convenient, but, in reality, it is often observed that the seating or unseating movement is not always smooth as desired, for example, depending on various conditions, such as age and physical structure, of the passenger. Thus, the utilization of movement of the passenger for activation of the seat belt apparatus can be detrimental to the intended operability in many cases. Besides, the prior art apparatus is often relatively complicated in structure, which can be a cause of difficulty in manufacture and of malfunctioning.

SUMMARY OF THE INVENTION

It is therefore a primary object of the present invention to obviate the disadvantages of the prior art described above and to provide an improved seat belt apparatus.

Another object of the present invention is to provide a seat belt apparatus which is extremely easy to operate and thus has an enhanced operability.

A further object of the present invention is to provide a seat belt apparatus which can be operated by a passenger in a seat with ease on his own will and without taking an uncomfortable posture, such as twisting the body.

A still further object of the present invention is to provide a seat belt apparatus relatively simple in structure and thus easy and inexpensive to manufacture.

A still further object of the present invention is to provide a seat belt apparatus reliable in operation and increased in safety.

Other objects, advantages and novel features of the present invention will become apparent from the following detailed description of the invention when considered in conjunction with the accompanying drawings.

BRIEF DESCRIPTION OF THE DRAWINGS

FIG. 6 is a schematic illustration showing on an enlarged scale the detailed structure of the main portion of the seat belt apparatus illustrated in FIG. 5;

FIG. 7 is a cross-sectional view taken along line A—A indicated in FIG. 6;

FIGS. 8 and 9 are schematic illustrations showing two further embodiments of the present invention; and FIG. 10 is a schematic illustration showing a still further embodiment of the present invention.

DESCRIPTION OF THE PREFERRED EMBODIMENTS

Figure 1:
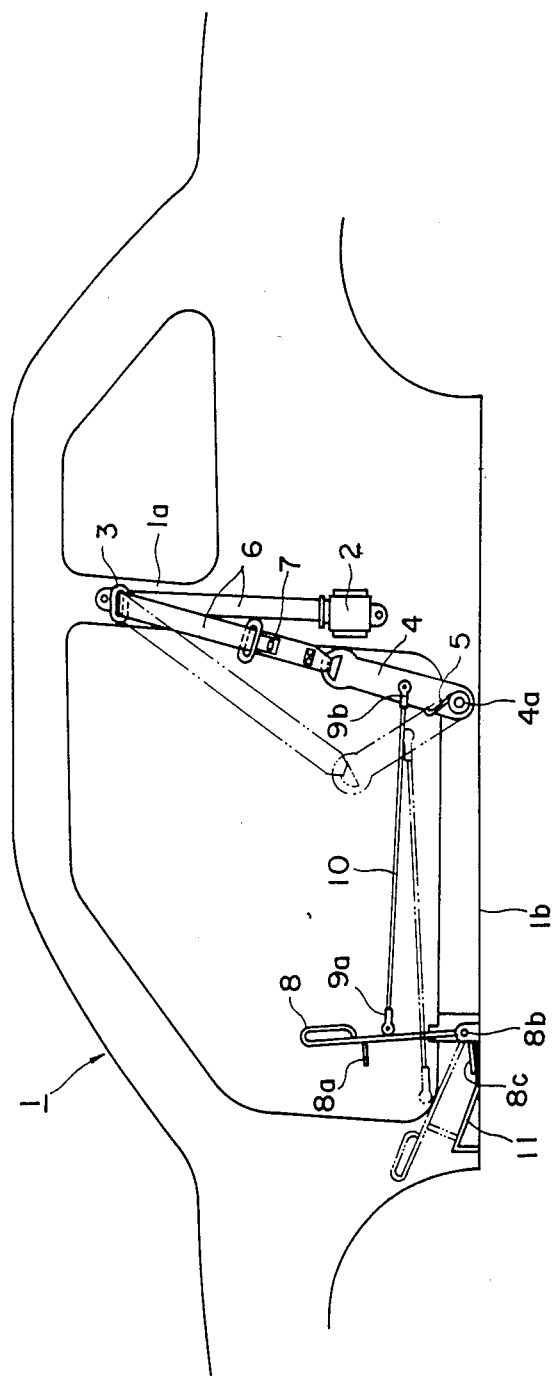
FIG. 1 is a schematic illustration showing a seat belt apparatus constructed in accordance with one embodiment of the present invention as provided in a two-door passenger car.

Referring now to the drawings, the present invention will be described in detail by way of embodiments. It is to be noted that although the following description will be made in the case where the present invention has been applied to the so-called three point seat belt assembly, the present invention should not be limited only to the three point seat belt assembly and may be applied to any other type of seat belt assembly.

Referring now to FIG. 1, there is schematically shown a two-door passenger car which is provided with a retractor 2 as fixedly mounted on a body 1 of the passenger car as located below a center pillar 1a of the body 1. The retractor 2 contains therein a part of a webbing 6 as wound around a shaft by a spring force and the webbing 6 may be gradually pulled out of the retractor 2 when the webbing 6 is grabbed and pulled by a passenger. In the illustrated embodiment, the webbing 6 extends upward along the center pillar 1a from the retractor 2 and then it passes through a through-anchor 3, which is pivotally mounted on the top portion of the center pillar 1a, to extend downward. The webbing 6 is then connected to the top end of an arm 4 whose base end is pivotally supported by a floor 1b of the body 1. The webbing 6 is provided with a lock tongue 7, and, thus, after pulling out the webbing 6 to place the webbing 6 around the body of passenger seated in position, the tongue 7 may be inserted into a buckle (not shown) disposed on the side opposite to the retractor with respect to the passenger seated in position for establishing a restraining condition of seat belt apparatus. When such a restraining condition has been established, the webbing 6 extends around the passenger seated in position so that the passenger is restrained from moving undesirably in the case of emergency, such as collision or the like.

The arm 4 is pivotally mounted on the floor 1b of the body 1 and it is normally urged to its retracted position indicated by the solid line by means of a return spring 5. Thus, the webbing 6 is normally located at its retacted position indicated by the solid line extending near vertically along the center pillar 1a. As described above, those elements including retractor 2, through-anchor 3, arm 4, webbing 6 and tongue 7 (plus mounting means for mounting the retractor 2 and the like on the body 1), in effect, constitute a three point seat belt assembly as restraining means.

As shown to the left in FIG. 1, there is also provided a pedal on the floor 1b of the body 1 which can pivot around a pivot shaft 8b as an operating means. The pedal 8 is disposed at a position where the passenger can easily operate with his foot bearing thereagainst while seated in position. In the illustrated embodiment, the pedal 8 is provided with a stopper 8a, and, when the pedal 8 is pushed forward from a normal position indicated by the solid line to an advanced position indicated by the dotted line, the stopper 8a comes into engagement with a receiving member 11 fixedly mounted on the floor 1b thereby limiting the further pivotal movement of the pedal 8. Also provided around the pivot shaft 8b is a return spring 8c, and, thus, the pedal 8 is normally urged to take the upright position indicated by the solid line.

The pedal 8 and the arm 4 are operatively connected by a wire 10 as a connecting means, and the wire 10 has its ends pivotally connected to the pedal 8 and to the arm 4 by means of end fittings 9a and 9b, respectively. Thus, when the passenger seated in position presses the pedal 8 with one of his feet bearing against the pedal 8, a driving force is transmitted to the arm 4 through the wire 10 thereby causing the arm 4 to pivot counterclockwise until it comes to the position indicated by the phantom line. The webbing 6 is then moved to the side or to the side and somewhat front of the passenger seated in position so that the passenger can easily grab the webbing 6 or tongue 7, whichever is desired, for operating the belt assembly without taking an uncomfortable posture, such as twisting his body, while seated in position. When the passenger removes his foot from the pedal 8, the pedal 8 automatically returns to its upright position indicated by the solid line by means of the return spring 8c.

Figure 2:
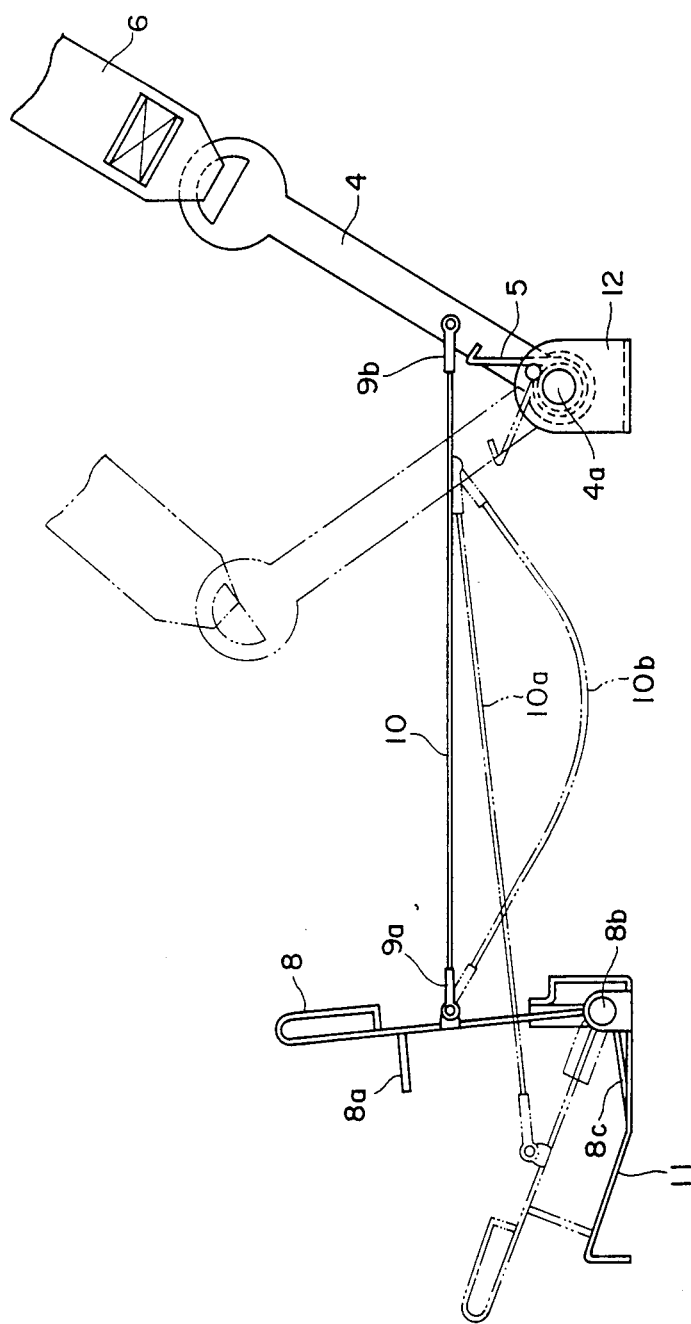
FIG. 2 is a schematic illustration showing on an enlarged scale the main portion of the seat belt apparatus illustrated in FIG. 1.

FIG. 2 shows the main portion of the structure shown in FIG. 1 further in detail, and, as shown, the pivot shaft 4a for pivotally supporting the arm 4 is held in position by a holding member 12 which is fixedly attached to the floor 1b. Around the pivot shaft 4a is provided the return spring 5 which always urges the arm 4 to pivot clockwise. In operation, the pedal 8, wire 10 and arm 4 normally take the respective positions indicated by the solid lines. After having seated in position inside of the car, when the passenger pushes the pedal 8 forward by his foot until it takes the position indicated by the phantom line, the arm 4 pivots counterclockwise to finally take the position indicated by the phantom line. The passenger can then easily grab either the webbing 6 or tongue 7 and (see FIG. 1) then pull the webbing 6 out of the retractor 2 to be placed around his body, followed by the step of having the tongue 7 inserted into the associated buckle to complete the seat belt application operation. On the other hand, when the passenger removes his foot from the pedal 8, the pedal 8 returns to its normal upright position indicated by the solid line, but the arm 4 stays at the advanced position indicated by the phantom line since the restraining condition of seat belt assembly is established. Accordingly, the wire 10 extending between the pedal 8 and the arm 4 becomes slackened to take the position 10b indicated by the phantom line.

Figure 3:
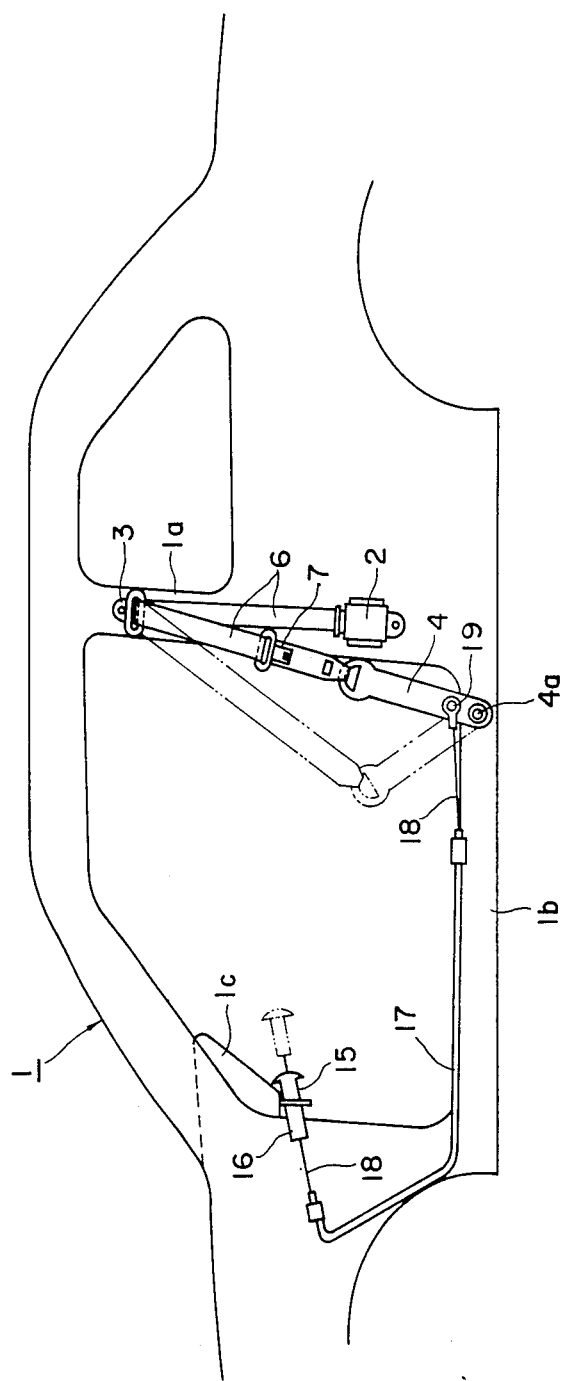
FIGS. 3-5 are schematic illustrations showing several embodiments of the present invention.

FIG. 3 shows another embodiment of the present invention, which is similar in structure to the previous embodiment shown in FIG. 1 in many respects, but, in the present embodiment, provision is made of a knob 15 in place of the pedal 8. That is, in the present embodiment, below a dashboard 1c of the body 1 is disposed a knob 15 which is normally received inside of a holder 16 and which may be pulled toward the passenger seated in position as grabbed by his hand. The knob 15 is operatively coupled to the pivotal arm 4 through a wire 18 whose terminal end is connected to the arm 4 by means of an end fitting 19. In the illustrated embodiment, a guide tube 17 is provided as mounted on the body 1 and the wire 18 extends through the guide tube 17. In operation, after sitting in position, when the passenger grabs the knob 15 by his hand and pulls it toward him until it is located at its advanced position indicated by the phantom line, the arm 4 pivots around the pivot shaft 4a counterclockwise to be located at the advanced position indicated by the phantom line. The webbing 6 is then located at an easily accessible position and, the passenger can grab the webbing 6 or tongue 7, whichever is desired, for application of the webbing 6 around his body.

In the embodiment shown in FIG. 3, it may be so structured that the knob 15 can be located at any desired position utilizing a friction between the wire 18 and the inner surface of the guide tube 17. Alternatively, it may also be so structured to make such a friction as small as possible while providing a return spring around the pivot shaft 4a such that the knob 15 and the arm 4 are always biased to take the respective normal positions indicated by the solid lines.

Figure 4:
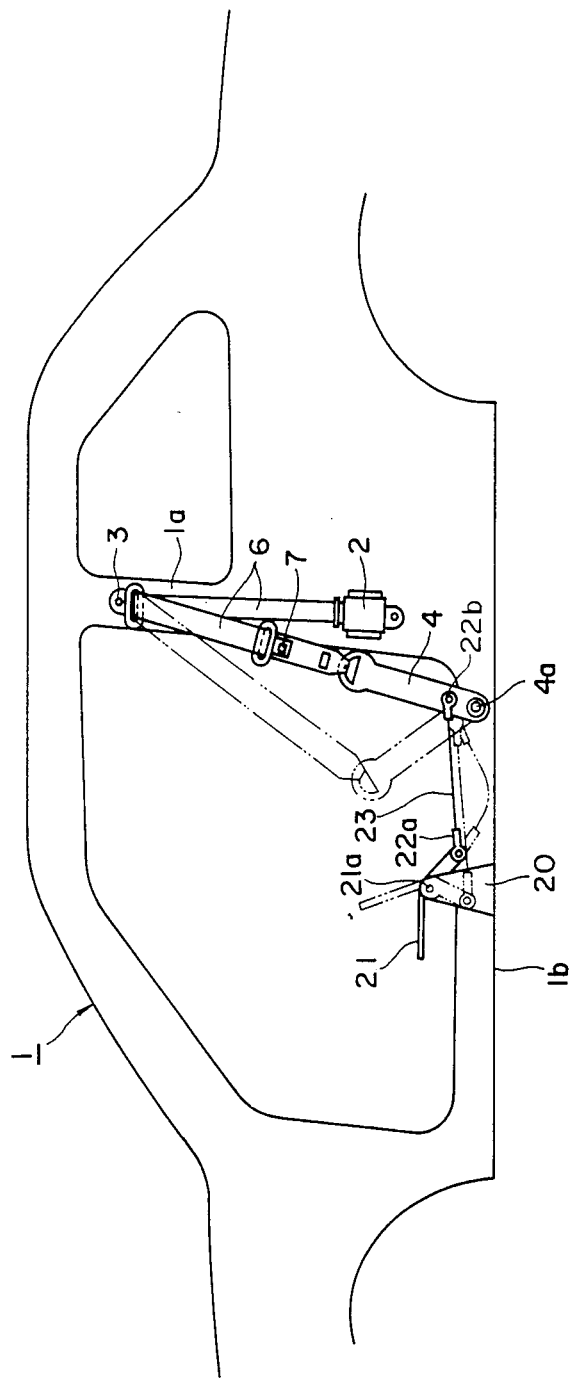

FIG. 4 illustrates a further embodiment of the present invention. In this case, similarly with the case of FIG. 3, there is provided a manually operable lever 21 which may be operated by the hand of the passenger. That is, in accordance with this embodiment, the manually operable lever 21 as operating means is disposed at a position which is sideways of a seat (not shown) and which allows the passenger to grab the lever with ease while seated in position. As shown, the lever 21 is provided to be pivotal around a pivot shaft 21a defining a part of lever holding member 20 which is fixedly attached to the floor 1b. Also provided is a wire 23 having one end connected to the bottom end of the lever 21 and the other end connected to the arm 4 through end fittings 22a and 22b, respectively. Accordingly, when the passenger seated in position grabs the lever 21 and causes it to pivot clockwise until it takes the advanced position indicated by the phantom line, the arm 4 pivots counterclockwise in association therewith to finally take the advanced position indicated by the phantom line thereby causing the webbing 6 and thus the tongue 7 to move to their forward positions easily accessible by the passenger seated in position without taking any uncomfortable posture.

Also in the present embodiment, it is preferable to provide a return spring around the pivot shaft 21a and/or pivot shaft 4a in which case the entire system is always biased to take its normal retracted position. When constructed in this manner, after establishing the restraining condition with the webbing 6 placed around the passenger seated in position, the wire 23 will become slackened as indicated by the phantom line in FIG. 4.

Figure 5:
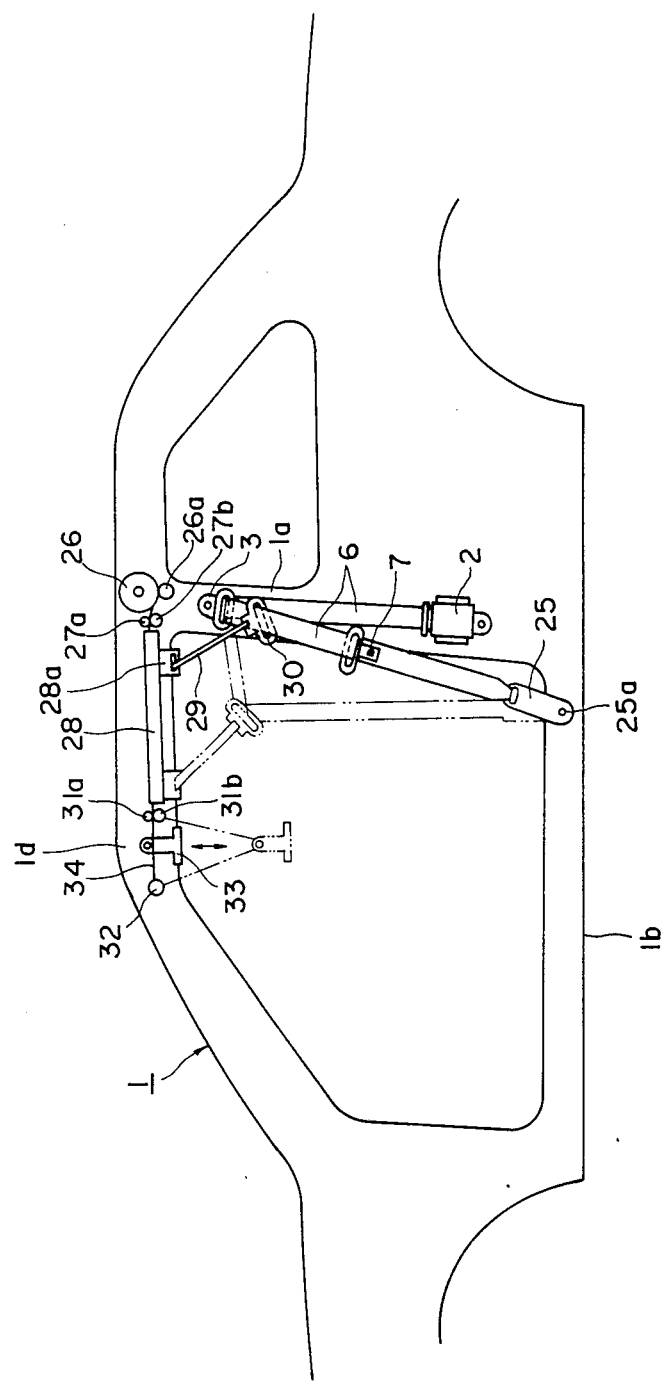

FIG. 5 shows a still further embodiment of the present invention. In the present embodiment, a wire 34 is provided as extending along a roof side 1d of the body 1 and a handle 33 as an operating means is operatively coupled to the wire 34 such that it may be pulled downward as grabbed by the passenger as indicated by the double-headed arrow. Described more in detail with respect to the structure of this embodiment, the webbing 6 pulled out of the retractor 2 extends upward along the center pillar 1a and after passing through through-anchor 3 it extends downward with its forward end connected to an anchor plate 25 which is pivotally supported by the floor 1b of the body 1 by means of a pivot shaft 25a. A slidable slip guide 30 is provided as slidable along the webbing 6 and the slip guide 30 is connected to the bottom end of a belt 29 which has its top end connected to a runner 28a which, in turn, is fixedly attached to the wire 34 extending along the roof side 1d of the body 1. A guide rail 28 is provided as extending along the roof side 1d and two pairs of guide rollers 27a-27b and 31a-31b are disposed on both ends of the guide rail 28.

The wire 34 has its one end fixedly connected to a take-up pulley 26 which is rotatably supported on the roof side 1d and its other end fixedly connected to a roller 32 which is also rotatably supported on the roof side 1d. In the illustrated embodiment, the pulley 26 is always urged to rotate in a winding direction, or in the counterclockwise direction in the illustrated embodiment, by means of a take-up spring (not shown). Also provided is the handle 33 in engagement with the wire 34 as located between the guide rollers 31a and 31b and the end roller 32. Under normal condition, the handle 33 is located adjacent to the roof side 1d and thus it is located away from the passenger seated in position so that it does not get into the way when the passenger gets into and out of the car. In the present embodiment, the runner 28a, belt 29, slip guide 30 and wire 34, in effect, define a connecting means.

In operation, after having seated in position, when the passenger lifts his hand to grab the handle 33 and pulls the handle 33 downward until it takes its advanced position indicated by the phantom line, the webbing 6 is moved forward through the wire 34 and belt 29 to be located at its advanced position indicated by the phantom line. The passenger then grab either the webbing 6 or tongue 7 easily without taking an awkward posture, for example, by twisting his body, and then place the webbing 6 around his body to establish the intended restraining condition.

FIG. 6 shows more in detail the main portion of the structure shown in FIG. 5 and FIG. 7 shows the cross-sectional shape of the guide rail 28. As shown in FIG. 6, the take-up pulley 26 is provided rotatably around a shaft 26b inside of a take-up device 35, and it is so structured that the shaft 26b is always urged to rotate counterclockwise. Thus, after grabbing the webbing 6 or tongue 7 by pulling the handle 33 downward, when the passenger releases the handle 33, the take-up pulley 26 rotates counterclockwise to place the wire 34 extending straight so that the handle 33 is returned to its retracted position located adjacent to the roof side 1d of the body. As shown in FIG. 7, the guide rail 28 has a generally C-shaped cross-sectional shape so that the runner 28a is partly housed in a channel defined by the guide rail 28 so as to be slidable therealong.

Figure 8:
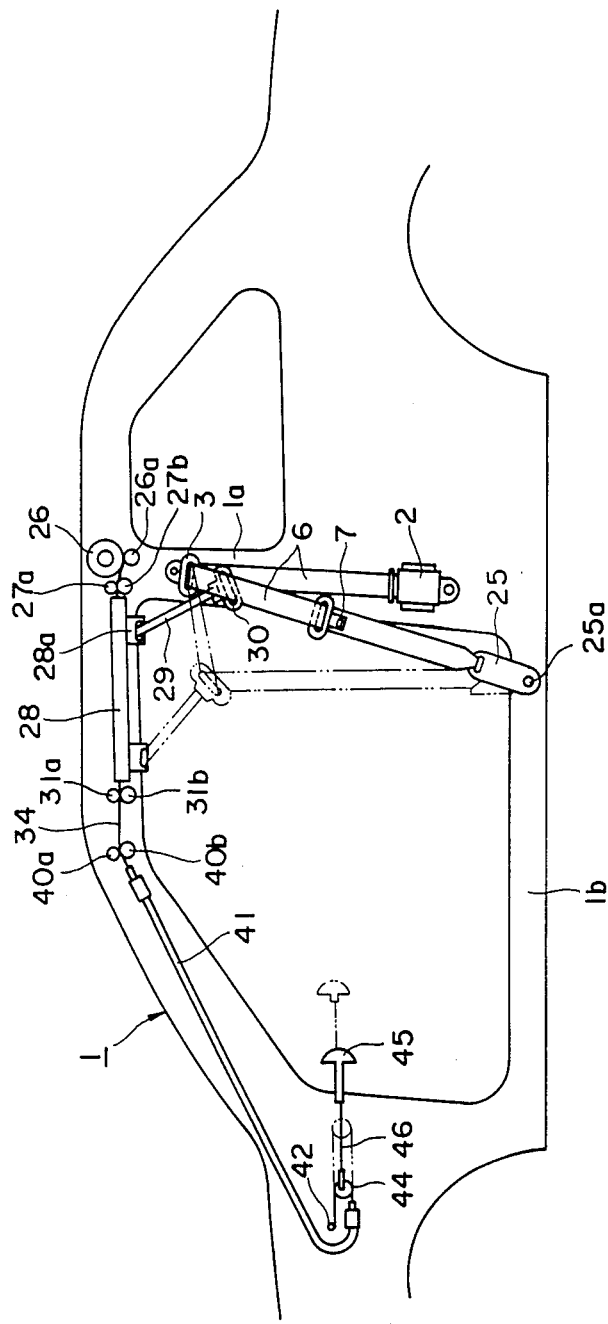

FIG. 8 is a still further embodiment of the present invention which is constructed as modified from the structure shown in FIGS. 6 and 7. In the present embodiment, provision is made of a manually operable knob 45 in place of the handle 33 provided in the embodiment shown in FIGS. 6 and 7. That is, an idler roller 44 is provided as rotatably connected at one end of an operating wire or rod 46 whose other end is fixedly connected to the knob 45. Also in this embodiment, when the knob 45 is pulled toward the passenger, similar effects as obtained when the handle 33 is pulled downward in the embodiment shown in FIGS. 6 and 7 will be obtained so that the webbing 6 is moved to its forward position easily accessible to the passenger seated in position.

FIG. 9 illustrates a still further embodiment of the present invention, in which case a pedal 43 is provided as an operating means in place of the knob 45 in the case of the embodiment shown in FIG. 8. Thus, in the present embodiment, the system may be operated by pushing the pedal 43 by the foot of passenger. Described more in detail, the present embodiment is similar in structure to the embodiment shown in FIG. 6 in many respects; however, in the present embodiment, the wire 34 passes between another pair of guide roller 40a and 40b provided on the roof side 1d, and after extending through another guide around the idler roller 44, its terminal end is fixedly tube 41 fixedly mounted on the body 1 and then passing attached to a fixed point 42 on the body 1. On the other hand, the idler roller 44 is rotatably mounted at the top of the pedal 43 which has its bottom end pivotally connected to a pivot shaft 43a mounted on the floor 1b of the body 1. Therefore, after sitting in position, when the passenger pushes the pedal 43 forward to be located in the advanced position indicated by the phantom line, the webbing 6 is moved forward to be located at its advanced position so that the passenger can easily grab the webbing 6 for application around his body.

It is to be noted that in the embodiment shown in FIG. 9, the guide rail 28 (shown in previous embodiments) is not provided and that portion of the wire 34 extending between the two pairs of guide rollers 31a-31b and 27a-27b is exposed.

FIG. 10 shows a still further modification of the present invention. In this case, in place of the elongated arm 4, for example, proficed in the embodiment shown in FIG. 1, there is provided an anchor plate 4' which is connected to the pivot shaft 4a and also to the bottom end of the webbing 6. In addition, a boot is provided to house therein the anchor plate 4' and a part of the webbing 6 as indicated by the phantom line, and the connecting wire 10 is connected to the boot by means of the end fitting 9b. Such a structure is preferred for obtaining increased safety.

As described above, in accordance with the present invention, it allows for the passenger to easily grab the webbing or tongue of the seat belt apparatus without taking an uncomfortable posture, for example twisting his body, and, thus, the operability and maneuverability are significantly enhanced. Besides, in accordance with the present invention, since the seat belt application operation may be initiated by the will of the passenger, its operability in that respect is also enhanced and the movement of passenger will not interfere with the operation of seat belt apparatus. Furthermore, as compared with the prior art structure, the present invention is simplified in structure and thus it is advantageous in manufacture and low in the possibility of malfunctioning.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A seat belt apparatus comprising:
   operating means operable by the foot of a person seated in position in a vehicle so as to move between either a first position or a second position which is separated away from said first position, said operating means including a pedal which is pivotally mounted on said vehicle so as to be pushed by a foot of said person seated in position;
   restraining means which is normally located at a retracted position defined in said vehicle and which is moved out of said retracted position to be placed around said person to keep said person in a restrained condition wherein said restraining means includes a three point seat belt having a webbing to be placed around said person in position for establishing said restrained condition; and
   connecting means for connecting said means operable by the foot of a person to said restraining means for moving said restraining means from said retracted position to an advanced position easily accessible by said person seated in position when said operating means is operated from said first position to said second position thereby allowing said person seated in position to grab said restraining means located at said advanced position without taking an uncomfortable posture.

2. A seat belt apparatus comprising:
   operating means operable by the hand of a person seated in position in a vehicle so as to move between either a first position or a second position which is separated away from said first position, said operating means including a lever which is pivotally mounted on said vehicle so as to be operated by a hand of said person seated in position;
   restraining means which is normally located at a retracted position defined in said vehicle and which is moved out of said retracted position to be placed around said person to keep said person in a restrained condition wherein said restraining means includes a three point seat belt having a webbing to be placed around said person in position for establishing said restrained condition; and
   connecting means for connecting said means operable by the hand of a person to said restraining means for moving said restraining means from said retracted position to an advanced position easily accessible by said person seated in position when said operating means is operated from said first position to said second position thereby allowing said person seated in position to grab said restraining means located at said advanced position without taking an uncomfortable posture.

3. A seat belt apparatus comprising:
   means operable by the hand of a person seated in position in a vehicle so as to move between either a first position or a second position which is separated away from said first position, said operating means including a knob or handle which is mounted on said vehicle so as to be pulled by a hand of said person;
   restraining means which is normally located at a retracted position defined in said vehicle and which is moved out of said retracted position to be placed around said person to keep said person in a restrained condition wherein said restraining means includes a three point seat belt having a webbing to be placed around said person in position for establishing said restrained condition; and
   connecting means for connecting said means operable by the hand of a person to said restraining means for moving said restraining means from said retracted position to an advanced position easily accessible by said person seated in position when said operating means is operated from said first position to said second position thereby allowing said person seated in position to grab said restraining means located at said advanced position without taking an uncomfortable posture.

4. The apparatus of any one of claims 1 through 3 further comprising urging means for normally urging said operating means to take said first position so that said operating means automatically returns to said first position when released.

5. A seat belt apparatus for use in a vehicle as provided therein, said apparatus comprising:
   storing means mounted on said vehicle;
   first guide means mounted on said vehicle generally above said storing means, said first guide means including a first slot;
   arm means pivotally mounted on said vehicle at a predetermined position;
   a webbing partly stored in said storing means as wound therein and extending upwardly from said storing means to said first guide means and, after passing through said first slot of said first guide means, extending substantially downward to have its forward end connected to said arm means;
   second guide means having a second slot through which that portion of said webbing extending between said first guide means and said arm means passes;
   operating means mounted on said vehicle and operable by a passenger seated in position in said vehicle by his hand or foot so as to move between a first position and a second position separated away from said first position; and
   connecting means for operatively connecting said operating means to said second guide means so that said webbing is moved from a retracted position to an advanced position, where said passenger seated in position can grab said webbing easily without taking any uncomfortable posture, when said operating means is moved from said first position to said second position.

6. The apparatus of claim 5 wherein said connecting means includes a first connection member extending along a roof side of said vehicle, said first connection member being extendable in length, and a second connection member having one end connected to a predetermined point of said first connection member and other end connected to said second guide means.

7. The apparatus of claim 6 wherein said operating means includes a handle provided as operatively connected to said first connection member whereby said first position of said handle is defined adjacent to said roof side and said second position is a position defined when said handle is pulled downward by said passenger.

8. The apparatus of claim 6 wherein said operating means includes a knob movably mounted on said vehicle and operatively connected to said one end of said first connection member whereby said knob may be moved between said first and second positions as grabbed by said passenger.

9. The apparatus of claim 6 wherein said operating means includes a pedal pivotally mounted on said vehicle and operatively connected to said one end of said first connection member whereby said pedal may be moved between said first and second positions by a foot of said passenger.

10. The apparatus of claim 6 wherein said connecting means further includes a guide tube having a C-shaped cross-section as extending along and fixedly mounted on said roof side and a runner which is fixedly attached to said first connection member extending through said guide tube, so that said runner slidably moves along said guide tube.

11. The apparatus of claim 5 wherein said storing means includes a retractor which normally pulls said webbing inside to keep said webbing in tension.

12. The apparatus of claim 5 further comprising a lock tongue mounted on said webbing.

* * * * *